(12) United States Patent
Johnson

(10) Patent No.: US 7,246,005 B2
(45) Date of Patent: Jul. 17, 2007

(54) METHOD AND APPARATUS FOR CONTROLLING A COMPONENT BY FEED-FORWARD CLOSED-LOOP CONTROLLER STATE MODIFICATION

(75) Inventor: Randall J. Johnson, Greenwood, IN (US)

(73) Assignee: Arvin Technologies, Inc., Troy, MI (US)

( * ) Notice: Subject to any disclaimer, the term of this patent is extended or adjusted under 35 U.S.C. 154(b) by 11 days.

(21) Appl. No.: 11/146,846

(22) Filed: Jun. 7, 2005

(65) Prior Publication Data

US 2006/0276956 A1    Dec. 7, 2006

(51) Int. Cl.
G06F 19/00   (2006.01)
F02M 7/00    (2006.01)

(52) U.S. Cl. .................. 701/111; 123/436; 123/674; 701/104

(58) Field of Classification Search ............ 701/101, 701/106, 110, 104, 111; 123/456, 494, 497, 123/357, 568.11, 568.31, 436, 674
See application file for complete search history.

(56) References Cited

U.S. PATENT DOCUMENTS

| 4,270,936 A | 6/1981 | Mann |
| 4,276,066 A | 6/1981 | Bly et al. |
| 4,281,512 A | 8/1981 | Mills |
| 4,319,896 A | 3/1982 | Sweeney |
| 4,335,574 A | 6/1982 | Sato et al. |
| 4,373,330 A | 2/1983 | Stark |
| 4,381,643 A | 5/1983 | Stark |
| 4,481,767 A | 11/1984 | Stark |
| 4,520,624 A | 6/1985 | Kiyota et al. |
| 4,573,317 A | 3/1986 | Ludecke |
| 4,582,026 A * | 4/1986 | Takita et al. ............ 122/448.1 |
| 4,651,524 A | 3/1987 | Brighton |
| 4,730,455 A | 3/1988 | Pischinger et al. |
| 4,840,028 A | 6/1989 | Kusuda et al. |
| 4,848,083 A | 7/1989 | Goerlich |
| 4,851,015 A | 7/1989 | Wagner et al. |
| 4,912,753 A * | 3/1990 | Evans, Jr. ................ 700/245 |
| 5,024,054 A | 6/1991 | Barris et al. |
| 5,048,287 A | 9/1991 | Howe et al. |
| 5,063,737 A | 11/1991 | Lopez-Crevillen et al. |
| 5,065,574 A | 11/1991 | Bailey |
| 5,094,075 A | 3/1992 | Berendes |

(Continued)

FOREIGN PATENT DOCUMENTS

JP    4308309    10/1992

OTHER PUBLICATIONS

Heilman, Robert K., "Fundamentals of Process Control Strategies" pp. 1-5, (Oct. 23, 2000).

Primary Examiner—John T. Kwon
(74) Attorney, Agent, or Firm—Barnes & Thornburg LLP

(57) ABSTRACT

An apparatus comprises a feed-forward arrangement and a closed-loop controller. The feed-forward arrangement is configured to determine a change of a system, the system change being independent of an output of a component of the system. The feed-forward arrangement is further configured to generate a feed-forward signal representative of the system change. The controller is configured to modify a state of the controller in response to the feed-forward signal and to perform closed-loop control of the component based on its modified state.

18 Claims, 3 Drawing Sheets

U.S. PATENT DOCUMENTS

| | | |
|---|---|---|
| 5,140,814 A | 8/1992 | Kreutmair et al. |
| 5,211,009 A | 5/1993 | Houben et al. |
| 5,251,564 A | 10/1993 | Rim et al. |
| 5,365,733 A | 11/1994 | Takeshima et al. |
| 5,656,048 A | 8/1997 | Smith et al. |
| 5,826,428 A | 10/1998 | Blaschke |
| 5,934,069 A | 8/1999 | Hert et al. |
| 5,946,906 A | 9/1999 | Akazaki et al. |
| 6,012,284 A | 1/2000 | Tanaka et al. |
| 6,052,195 A * | 4/2000 | Mestha et al. ............... 356/425 |
| 6,063,150 A | 5/2000 | Peter et al. |
| 6,182,445 B1 | 2/2001 | Yamazaki et al. |
| 6,233,926 B1 | 5/2001 | Bailey et al. |
| 6,321,533 B1 | 11/2001 | Watanabe et al. |
| 6,327,852 B1 | 12/2001 | Hirose |
| 6,334,306 B1 | 1/2002 | Mori et al. |
| 6,422,006 B2 | 7/2002 | Ohmori et al. |
| 6,581,574 B1 * | 6/2003 | Moran et al. ............... 123/497 |
| 6,662,140 B2 | 12/2003 | Martis |
| 6,694,727 B1 | 2/2004 | Crawley et al. |

\* cited by examiner

US 7,246,005 B2

METHOD AND APPARATUS FOR CONTROLLING A COMPONENT BY FEED-FORWARD CLOSED-LOOP CONTROLLER STATE MODIFICATION

FIELD OF THE DISCLOSURE

The present disclosure relates to methods and apparatus for controlling operation of components.

BACKGROUND OF THE DISCLOSURE

There are a variety of ways to control operation of components. For example, there are open-loop strategies and closed-loop strategies for controlling component operation.

SUMMARY OF THE DISCLOSURE

According to an aspect of the present disclosure, there is provided an apparatus comprising a feed-forward arrangement and a closed-loop controller. The feed-forward arrangement is configured to determine a change of a system, the system change being independent of an output of a component of the system. The feed-forward arrangement is further configured to generate a feed-forward signal representative of the system change. The controller is configured to modify a state of the controller in response to the feed-forward signal and to perform closed-loop control of the component based on its modified state. In an implementation, the component is configured as a thermal regenerator for generating heat to burn off particulate matter trapped by a particulate filter so as to regenerate the particulate filter for further use. An associated method is disclosed.

The above and other features of the present disclosure will become apparent from the following description and the attached drawings.

DETAILED DESCRIPTION OF THE DRAWINGS

Figure 1:
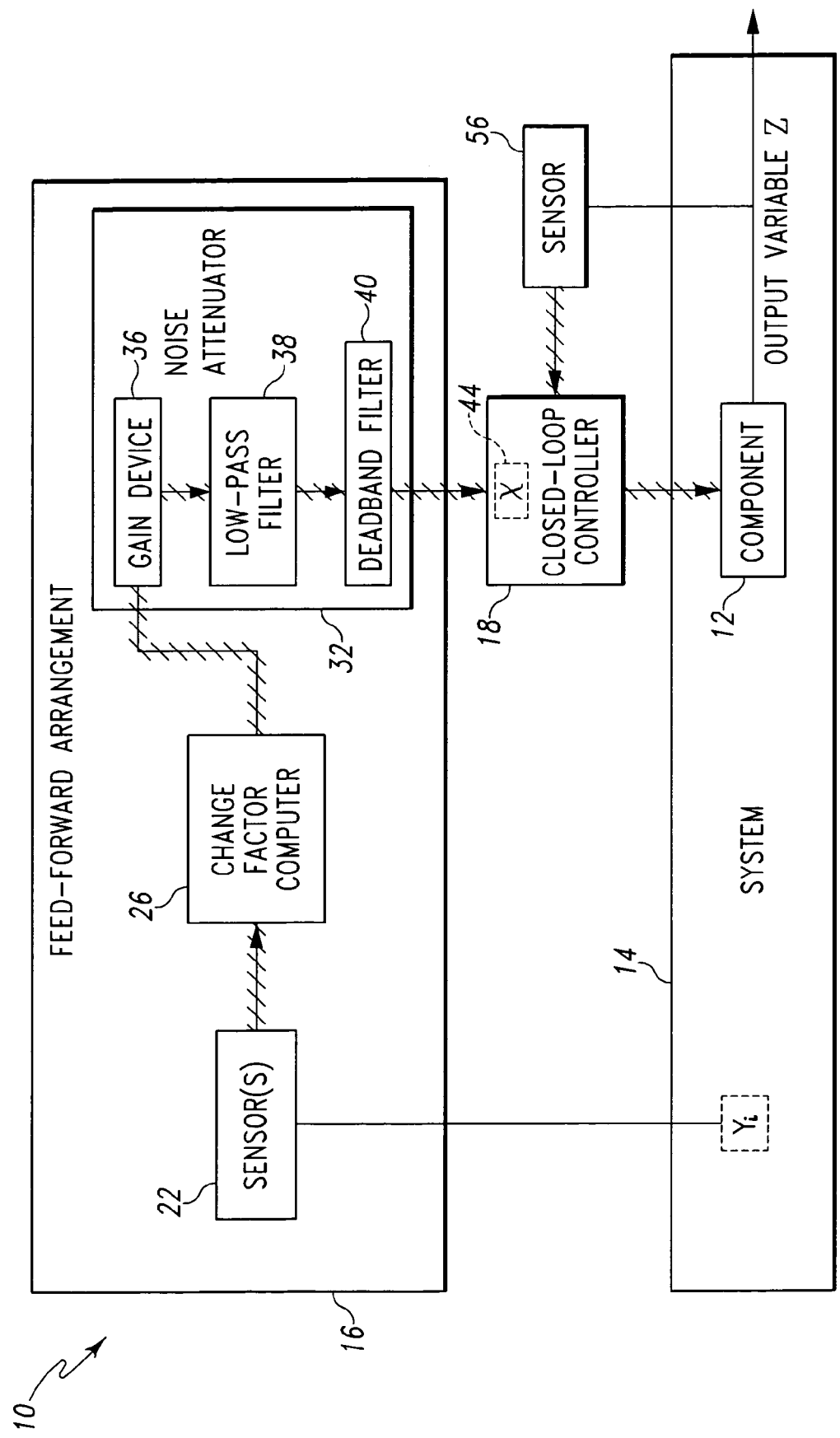
FIG. 1 is a simplified block diagram of an apparatus for controlling operation of a component.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring to FIG. 1, there is shown an apparatus 10 for controlling operation of a component 12 of a system 14. A feed-forward arrangement 16 of the apparatus 10 is configured to determine a change of the system 14, the system change being independent of an output of the component 12. The feed-forward arrangement is further configured to generate a feed-forward signal representative of the system change. A closed-loop controller 18 of the apparatus 10 (e.g., PID controller, state variable controller, fuzzy controller) is configured to modify a state X of the controller 18 in response to the feed-forward signal and to perform closed-loop control of the component 12 based on its modified state X. The apparatus 10 thus benefits from the relatively rapid response of the open-loop control strategy associated with the feed-forward arrangement 16 and the reduced complexity and capacity of the closed-loop control strategy associated with the closed-loop controller 18.

Figure 2:
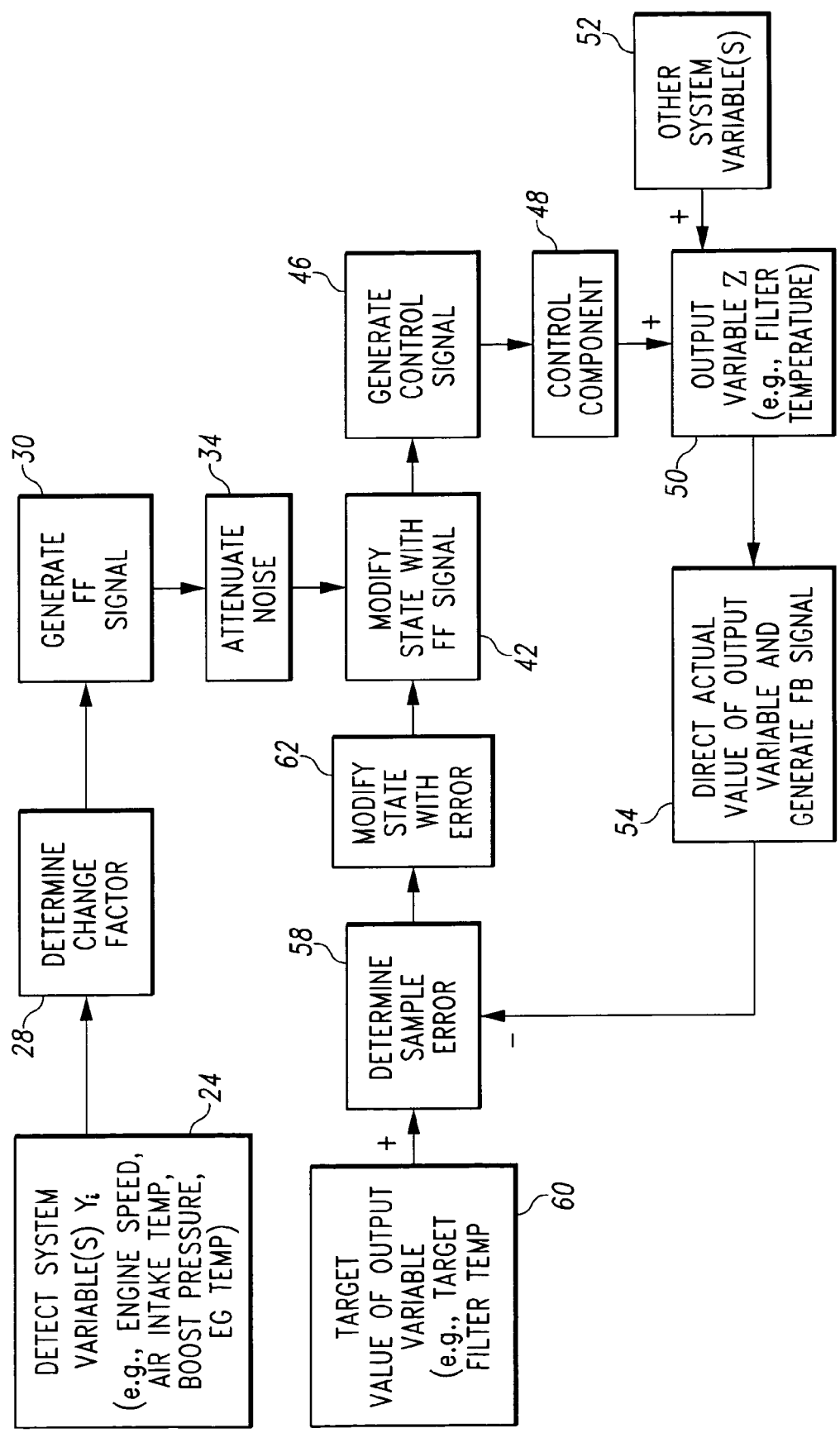
FIG. 2 is a flowchart of a method for controlling operation of the component.

Referring to FIGS. 1 and 2 together, the feed-forward arrangement 16 has a number of sensor(s) 22 which, at step 24, detect(s) system variable(s) $Y_i$ of the system 14. The variable(s) $Y_i$ is(are) independent of an output variable Z associated with an output of the component 12. As such, each variable $Y_i$ may be considered as a "feed-forward" variable $Y_i$.

The information acquired by the sensor(s) 22 is transmitted electrically to a change factor computer 26 of the feed-forward arrangement 16. At step 28, the computer 26 determines a change of the system 14. This "system change" may relate to a change of only a single variable $Y_i$ or may relate to the net change of a plurality of variables $Y_i$. In either case, the computer 26 determines a system change factor based on the change(s) of the variable(s) $Y_i$, the system change factor representing the system change.

Exemplarily, the system change factor is a fractional change factor (e.g., 1.2 representing a 20% increase, 0.8 representing a 20% decrease). In the case of a plurality of variables $Y_i$, the system change factor is a net fractional change factor representative of the net change of the variables $Y_i$. Such a net fractional change factor is determined by calculating an individual fractional change factor for each variable $Y_i$ and multiplying those individual change factors to obtain the system change factor.

At step 30, the computer 26 generates a feed-forward signal representative of the system change factor and thus representative of the change(s) of the feed-forward system variable(s) $Y_i$. Thus, changes in the variable(s) $Y_i$ over time may cause the system change factor and corresponding feed-forward signal to change accordingly.

The computer 26 is electrically coupled to a noise attenuator 32 and transmits the feed-forward signal thereto. At step 34, the noise attenuator 32 attenuates noise that may be present in the feed-forward signal. Illustratively, the noise attenuator 32 may include a gain device 36, a low-pass filter 38, and/or a deadband filter 40. It is to be understood that the gain device 36, the low-pass filter 38, and the deadband filter 40 may be positioned in any order relative to one another. The gain device 36 may be used to tune the sensitivity of the feed-forward signal.

The cutoff frequency of the low-pass filter 38 may be selected based on the sampling frequency of the sensor(s) 22. For example, in the case of a sampling frequency of about 10 Hz, the cutoff frequency may be about 5 Hz. It should be appreciated that a wide variety of cutoff frequencies may be useful including, but not limited to, cutoff frequencies in the range of 1 Hz to 500 Hz.

The deadband filter 40 may be used to block transmission of system change factors that do not represent a large enough system change. Merely by way of example and not limitation, the feed-forward signal could be filtered by the deadband filter 40 to block transmission of system change factors in the range of 0.9 to 1.1.

After attenuation of noise in the feed-forward signal, the feed-forward signal is transmitted to the controller 18. At step 42, the controller 18 applies the system change factor provided by the feed-forward signal to the state X of the controller 18 so as to modify the state X. In this way, the controller 18 is able to account for the changes in the system variable(s) $Y_i$ as it controls operation of the component 12.

Exemplarily, the state X is the state variable stored in an integrator 44 of the controller 18. In such a case, the integrator 44 is used to add over time the errors between actual and target values of the output variable Z (as explained in more detail below) and to store that error sum as the state variable of the integrator 44. The system change factor is multiplied to that error sum to obtain the modified state variable X (or, more generally stated, the modified state X).

At step 46, the controller 18 generates a control signal based on the modified state X and transmits that control signal to the component 12. At step 48, operation of the component 12 is thus controlled by the control signal. At step 50, the output variable Z is produced as a function of operation of the component 12 and possibly other system variables (e.g., aging, failures, and damage, to name just a few) represented in block 52.

At step 54, a sensor 56 detects samples of the output variable Z at a sample frequency and generates a feedback signal representative of each sample of the output variable Z. The feedback signal is transmitted to the controller 18. The controller 18, component 12, and sensor 56 are thus part of a closed-loop control circuit for controlling operation of the component 12.

At step 58, the controller 18 determines a sample error by calculating the difference between each detected, actual value of the output variable Z and a target value 60 of the output variable Z stored in the controller 18. At step 62, the integrator 44 adds these sample errors over time to create an error sum. This error sum is stored in the integrator 44 as the state variable X of the integrator 44. The state variable X is thus modified each time a new error is added thereto. It is this error sum, or state variable X, which is modified by the system change factor at step 42 upon multiplication of the system change factor to the error sum. As such, adjustment of the control signal and corresponding adjustment of control of the component 12 is thus provided according to changes of the feed-forward variables Yi detected by the feed-forward arrangement 16 and changes of the feedback output variable Z detected by the sensor 56.

Figure 3:
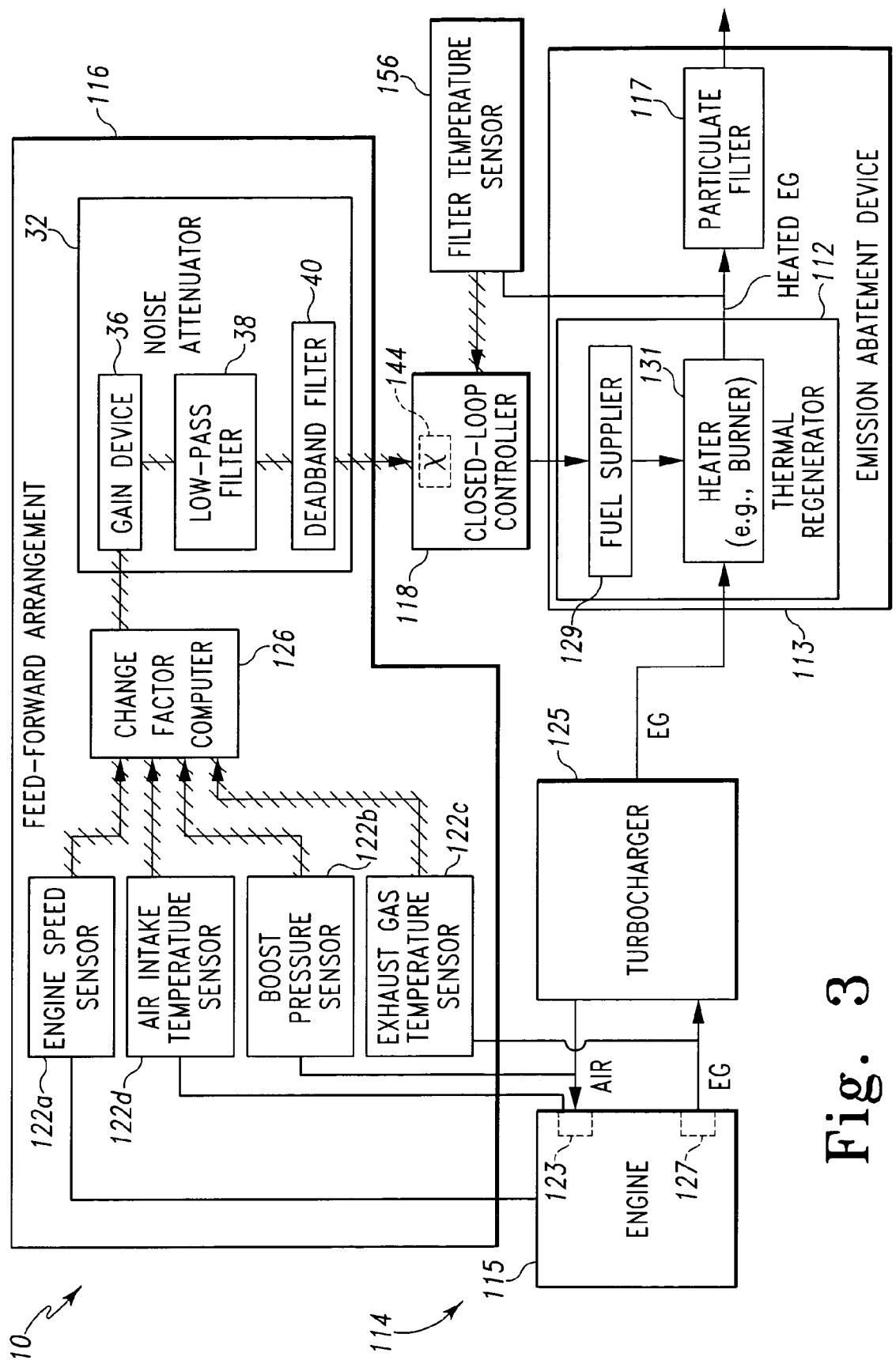
FIG. 3 is a simplified block diagram of an apparatus for controlling operation of a thermal regenerator configured to burn off particulate matter trapped by a particulate filter to regenerate the filter.

Referring to FIG. 3, there is shown an apparatus 110 which is an implementation of the apparatus 10. The apparatus 110 is configured for controlling operation of a component such as a thermal regenerator 112. The thermal regenerator 112 is part of an emission abatement device 113 of an engine/exhaust system 114 and is configured to heat exhaust gas ("EG" in FIG. 3) of an internal combustion engine 115 (e.g., diesel engine) of the system 114 for use in burning off particulate matter trapped by a particulate filter 117 of the device 113 to regenerate the filter 117.

A feed-forward arrangement 116 of the apparatus 110 is configured to determine an energy change of the system 114, the system energy change being independent of the output (i.e., the heated exhaust gas) of the thermal regenerator 112. The feed-forward arrangement is further configured to generate a feed-forward signal representative of the system energy change. A closed-loop controller 118 of the apparatus 110 (e.g., PID controller, state variable controller, fuzzy controller) is configured to modify a state X of the controller 118 in response to the feed-forward signal and to perform closed-loop control of supply of fuel from a fuel supplier 129 of the regenerator 112 to a heater 131 of the regenerator 112 based on the modified state X of the controller 118. The apparatus 110 thus benefits from the relatively rapid response of the open-loop control strategy associated with the feed-forward arrangement 116 and the reduced complexity and capacity of the closed-loop control strategy associated with the closed-loop controller 118.

Referring to FIGS. 2 and 3 together, the feed-forward arrangement 116 includes an engine speed sensor 122a, a boost pressure sensor 122b, an exhaust gas temperature sensor 122c, and possibly an air intake temperature sensor 122d. At step 24, the engine speed sensor 122a senses the speed of the engine 115 and the boost pressure sensor 122b senses the boost pressure of air provided to an air intake 123 of the engine 115 by a turbocharger 125 operated by exhaust gas discharged an exhaust gas outlet 127 of the engine 115. Changes of the engine speed and boost pressure are indicative of changes in the exhaust gas flow rate (e.g., mass flow rate). In addition, the exhaust gas temperature sensor 122c senses the temperature of exhaust gas at location between the exhaust gas outlet 127 and the thermal regenerator 112. When the air intake temperature sensor 122d is included, the air intake temperature sensor 122d senses the temperature of air in the air intake 123.

At step 28, a change factor computer 126 determines a net fractional system change factor representative of a net energy change of the system 114. To determine the system change factor, the computer 126 uses information received from the engine speed sensor 122a to determine a fractional change factor representative of a change of the engine speed and uses information received from the boost pressure sensor 122b to determine a fractional change factor representative of a change of the boost pressure. The engine speed and boost pressure change factors are multiplied together to obtain a fractional change factor representative of the change of the exhaust gas flow rate. Changes to the fuel requirement of the heater 131 are directly proportional (or reasonably nearly directly proportional) to such changes of the exhaust gas flow rate. It is within the scope of this disclosure to use only one of (rather than both of) the engine speed sensor 122a and boost pressure sensor 122b to determine changes in the exhaust gas flow rate and thus the flow rate fractional change factor.

The computer 126 uses information received from the exhaust gas temperature sensor 122c to determine a fractional change factor representative of a change in the difference between the target value 60 and the exhaust gas temperature. Changes to the fuel requirement of the heater 131 are directly proportional (or reasonably nearly directly proportional) to such changes in this difference.

When the air intake temperature sensor 122d is included, the computer 126 uses information received from the air intake temperature sensor 122d to determine a fractional change factor representative of a change of the temperature of the engine intake air. Changes to the fuel requirement of the heater 131 are inversely proportional (or reasonably nearly inversely proportional) to such intake air temperature changes.

The system change factor is determined based on changes of the exhaust gas flow rate, exhaust gas temperature, and possibly also the air intake temperature. In particular, the system change factor is determined by multiplying together the flow rate change factor, the exhaust gas temperature change factor, and, when the sensor 122d is included, the inverse of the intake air temperature change factor. The system change factor thus represents changes of variables of the system 114 independent of the output of the heater 131 and specifies the change in the amount of fuel that is to be supplied from the fuel supplier 129 to the heater 131 due to such system variable changes. At step 30, the computer 126 generates a feed-forward signal representative of the system change factor as the system change factor changes over time according to the sampling rate of the feed-forward arrangement 116.

The feed-forward arrangement 116 includes the noise attenuator 32 to attenuate noise in the feed-forward signal. In particular, the feed-forward arrangement 116 includes the gain device 36, the low-pass filter 38, and/or the deadband filter 40. As such, at step 34, the noise attenuator 32 attenuates noise in the feed-forward signal before the controller 118 receives the feed-forward signal.

After attenuation of noise in the feed-forward signal, the feed-forward signal is transmitted to the controller 118. At step 42, the controller 118 applies the system change factor provided by the feed-forward signal to the state X of the controller 118 so as to modify the state X. In this way, the controller 18 is able to adjust the amount of fuel supplied to the heater 131 according to changes in the exhaust gas flow rate, exhaust gas temperature, and possibly the air intake temperature.

Exemplarily, the state X is the state variable stored in an integrator 144 of the controller 118. In such a case, the integrator 144 is used to add over time the errors between actual and target values of a temperature associated with the particulate filter 117. Such a filter temperature may be, for example, the temperature of exhaust gas heated by the heater 131 and located relatively near an inlet of the filter 117. The integrator 144 stores the error sum as the state variable of the integrator 144. The system change factor is multiplied to that error sum to obtain the modified state variable X (or, stated more generally, the modified state X).

At step 46, the controller 118 generates a control signal based on the modified state X and transmits that control signal to the fuel supplier 129. At step 48, the structure of the fuel supplier 129 controlled by the control signal may include, for example, a fuel valve that controls flow of fuel to the heater 131 where the fuel is combusted to heat the exhaust gas flowing to the particulate filter 117 to burn off particulate matter trapped thereby. Operation of the thermal regenerator 112 is thus controlled by the control signal generated by the controller 118.

Exemplarily, the heater 131 may be a fuel-fired burner alone or in combination with an oxidation catalyst (e.g., diesel oxidation catalyst) positioned between the burner and the particulate filter 117. In either case, the amount of fuel supplied to the burner is controlled by the control signal.

At step 50, control of the thermal regenerator 112 is used to control a temperature associated with the filter 117. As alluded to above, this filter temperature may be a temperature of the exhaust gas heated by the heater 131 and located upstream from or at an exhaust gas inlet of the filter 117. The filter temperature is thus produced as a function of operation of the thermal regenerator 112 and possibly other system variables (e.g., aging, failures, and damage, to name just a few) represented in block 52.

At step 54, a filter temperature sensor 156 detects actual values of the filter temperature at a sample frequency and generates a feedback signal representative of each such sample. The feedback signal is transmitted to the controller 118. The controller 118, thermal regenerator 112, and sensor 156 are thus part of a closed-loop control circuit for controlling operation of the thermal regenerator 112.

At step 58, the controller 118 determines a sample error by calculating the difference between each actual value of the filter temperature and a target value 60 of the filter temperature stored in the controller 118. At step 62, the integrator 144 adds these sample errors over time to create an error sum. This error sum is stored in the integrator 144 as the state variable X of the integrator 144. The state variable X is thus modified each time a new error is added thereto. It is this error sum, or state variable X, which is modified by the system change factor at step 42 upon multiplication of the system change factor to the error sum. As such, adjustment of the control signal and corresponding adjustment of control of the thermal regenerator 112 is thus provided according to changes of the feed-forward variables (i.e., engine speed, boost pressure, exhaust gas temperature, and possibly air intake temperature) detected by the feed-forward arrangement 116 and changes of the feedback variable (i.e., the filter temperature) detected by the sensor 156.

It is within the scope of this disclosure to control the thermal regenerator 112 in a manner as disclosed herein to thermally manage a variety of emission abatement elements in addition to or in place of the particulate filter 117. Such emission abatement elements include, without limitation, selective catalytic reduction devices ("SCR devices") and NOx traps. As such, the thermal regenerator 112 can be used to heat an SCR device to its operational temperature and can be used to elevate the temperature of a NOx trap to de-sulfurize the NOx trap.

It is to be understood that the apparatus 10 and method associated therewith can be used with other systems and components thereof to be controlled. By way of example and not limitation, the apparatus 10 and associated method may find application in cruise control systems.

While the concepts of the present disclosure have been illustrated and described in detail in the drawings and foregoing description, such illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A method of controlling an emission abatement device of an emission abatement system, comprising the steps of:
   determining a change of the emission abatement system, the emission abatement system change being independent of an output of the emission abatement device,
   generating a feed-forward signal representative of the emission abatement system change,
   attenuating noise in the feed-forward signal,
   modifying a state of a closed-loop controller with the feed-forward signal, and
   performing closed-loop control of the component based on the modified state of the controller.

2. The method of claim 1, wherein:
   the determining step comprises determining changes of a plurality of variables of the emission abatement system, and the generating step comprises generating the feed-forward signal based on the emission abatement system variable changes.

3. The method of claim 1, wherein the modifying step comprises modifying a state variable of an integrator of the controller.

4. The method of claim 3, wherein the modifying step comprises (i) generating a feedback signal representative of actual values of a variable associated with an output of the emission abatement device, (ii) determining errors between the actual values and a target value of the variable, (ii) adding the errors over time, and (iii) modifying the error sum with the feed-forward signal.

5. The method of claim 1, wherein:
the determining step comprises determining an energy change of the emission abatement system, and
the generating step comprises generating the feed-forward signal based on the energy change, and
the performing step comprises controlling the emission abatement device with a control signal generated by the controller based on its modified state.

6. The method of claim 1, wherein:
the determining step comprises determining an emission abatement system change factor based on one or both of a change of a flow rate of exhaust gas of an engine and a change of a temperature of the exhaust gas,
the generating step comprises generating the feed-forward signal such that the feed-forward signal represents the emission abatement system change factor, and
the modifying step comprises applying the emission abatement system change factor to a state variable of the controller with the feed-forward signal.

7. The method of claim 6, comprising:
determining the emission abatement system change factor by determining a change of the exhaust gas flow rate and determining a change of the exhaust gas temperature at a location upstream from a fuel-fired burner,
heating an exhaust gas particulate filter in response to operation of the fuel-fired burner,
sensing actual filter temperatures associated with the particulate filter,
determining errors between the actual filter temperatures and a target filter temperature,
adding the errors over time,
multiplying that error sum by the system change factor so as to produce a modified state variable of the controller, and
controlling supply of fuel to the fuel-fired burner with a control signal generated based on the modified state variable.

8. The method of claim 7, wherein the step of determining the exhaust gas flow rate comprises determining a change of a speed of the engine and a change of a boost pressure provided to the engine by a turbocharger operated by the flow of exhaust gas.

9. An apparatus, comprising:
an emission abatement system comprising an emission abatement device,
a feed-forward arrangement configured to determine a change of the emission abatement system and configured to generate a feed-forward signal representative of the emission abatement system change, the emission abatement system change being independent of an output of the emission abatement device, wherein the feed-forward arrangement includes a noise attenuator configured to attenuate noise in the feed-forward signal, and a closed-loop controller configured to modify a state of the controller in response to the feed-forward signal and to perform closed-loop control of the emission abatement device based on the modified state of the controller.

10. The apparatus of claim 9, wherein:
the feed-forward arrangement is configured to determine an emission abatement system change factor based on changes of a plurality of variables of the system and to generate the feed-forward signal so as to be representative of the emission abatement system change factor, and
the controller is configured to modify a state variable of the controller with the emission abatement system change factor in response to receipt of the feed-forward signal and to transmit to the emission abatement device a control signal generated based on the modified state variable.

11. The apparatus of claim 9, wherein the controller is configured to transmit to the emission abatement device a control signal generated based on the modified state.

12. The apparatus of claim 1, wherein the noise attenuator comprises a gain device, a low-pass filter, or a deadband filter.

13. The apparatus of claim 9, wherein:
the controller comprises an integrator configured to add over time errors between actual and target values of a variable associated with an output of the emission abatement device to produce a state variable of the integrator, and
the controller is configured to modify the integrator state variable in response to the feed-forward signal.

14. The apparatus of claim 9, wherein the controller is a PID controller, a state variable controller, or a fuzzy controller.

15. The apparatus of claim 9, wherein:
the emission abatement system comprises an engine and an emission abatement element,
the emission abatement device comprises a thermal regenerator configured to heat the emission abatement element,
the feed-forward arrangement is configured to determine an emission abatement system change factor based on the emission abatement system change which is independent of an output of the thermal regenerator and to generate the feed-forward signal so as to be representative of the system change factor, and
the controller is configured to modify a state variable of the controller with the emission abatement system change factor in response to receipt of the feed-forward signal and to transmit to the thermal regenerator a control signal generated based on the modified state variable.

16. The apparatus of claim 15, wherein:
the thermal regenerator comprises a fuel supplier electrically coupled to the controller and a heater configured to receive fuel from the fuel supplier, and
the feed-forward arrangement is configured to determine the emission abatement system change factor based on changes of an exhaust gas flow rate and an exhaust gas temperature upstream from the heater.

17. The apparatus of claim 16, wherein the feed-forward arrangement is configured to determine the emission abatement system change factor based on a change of an air intake temperature of the engine.

18. The apparatus of claim 15, wherein:
the thermal regenerator comprises a fuel-fired burner, the emission abatement system comprises a turbocharger, the emission abatement element comprises a particulate filter, the feed-forward arrangement comprises (i) a boost pressure sensor configured to sense a boost pressure provided to the engine by the turbocharger, (ii) an engine speed sensor configured to sense a speed of the engine, (iii) an exhaust gas temperature sensor configured to sense an exhaust gas temperature of exhaust gas at a location between the engine and the burner, and (iv) an emission abatement system change factor computer coupled to the boost pressure sensor, the engine speed sensor, and the exhaust gas temperature sensor and configured to determine the emission abatement system change factor based on changes in the boost pressure, the engine speed, and the exhaust gas temperature and to generate the feed-forward signal representative of the emission abatement system change factor, and the controller is included in a closed-loop control circuit comprising the burner and a filter temperature sensor configured to sense a filter temperature associated with the particulate filter and to generate a feedback signal representative of the filter temperature and used by the controller in addition to the emission abatement system change factor to modify the state variable of the controller.

* * * * *